July 20, 1971 J. C. WILLIAMS 3,594,273
SEQUENTIAL ACCRETION OF PLURAL-FIBER ARTICLES
Filed May 15, 1967 2 Sheets-Sheet 1

INVENTOR.
JOHN C. WILLIAMS
BY Murray Schaffer
ATTORNEY

July 20, 1971 J. C. WILLIAMS 3,594,273
SEQUENTIAL ACCRETION OF PLURAL-FIBER ARTICLES
Filed May 15, 1967 2 Sheets-Sheet 2
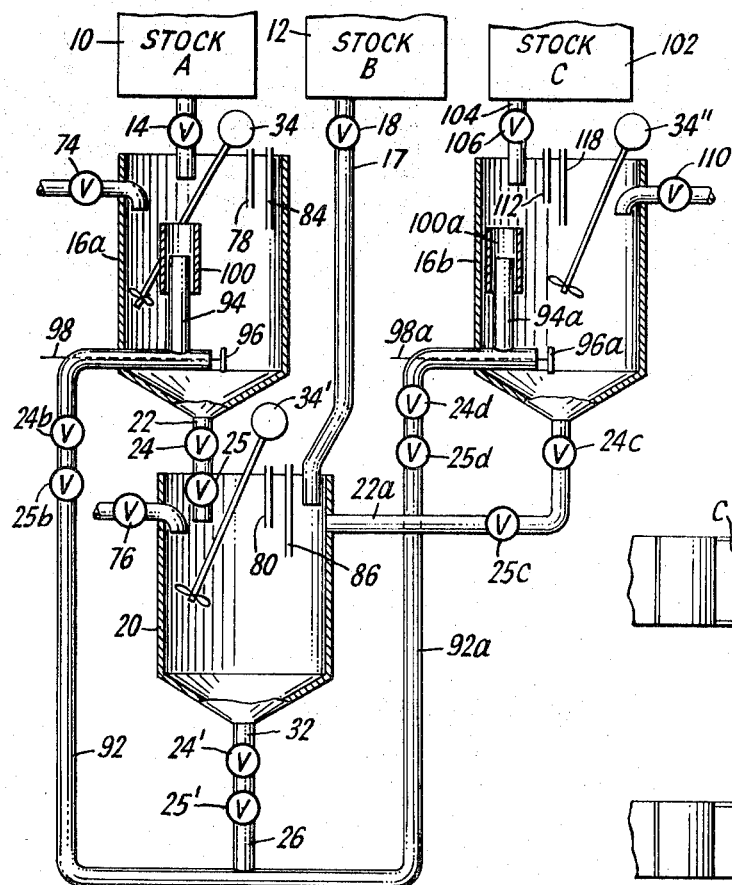
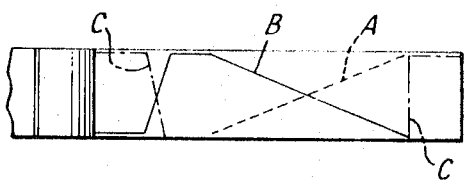
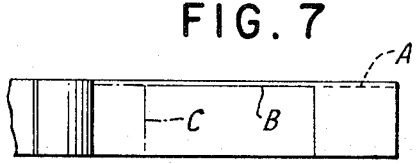
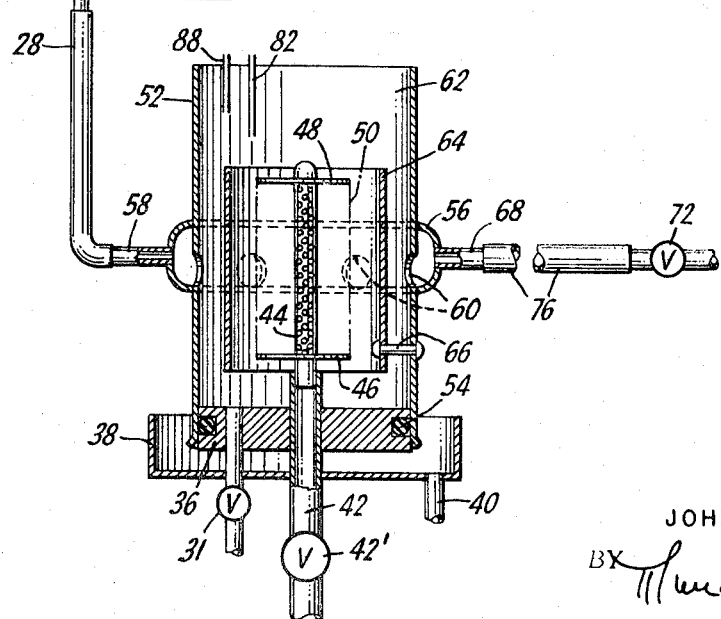
INVENTOR.
JOHN C. WILLIAMS
BY
ATTORNEY United States Patent Office 3,594,273
Patented July 20, 1971

1

3,594,273
SEQUENTIAL ACCRETION OF PLURAL-FIBER
ARTICLES
John Covington Williams, Meriden, Conn., assignor to
AMF Incorporated
Filed May 15, 1967, Ser. No. 638,549
Int. Cl. B29j 5/00
U.S. Cl. 162—219
17 Claims

ABSTRACT OF THE DISCLOSURE

A method and apparatus for accreting fibrous particles containing a plurality of fibrous components. A plurality of slurry tanks supply a plurality of different stock slurries to an accreting receptacle with an article former therein. The slurries are supplied to the accreting receptacle substantially at the mid-portion of the former. By means of a series of conduits and valves, the stock slurry tanks are serially interconnected so that the slurries may be supplied to the receptacle in any sequential order and in any mixed proportions, the conduits and valves being connected to the tanks so as to by-pass any particular tank when desired. Another conduit and valve is provided to supply liquid directly to the receptacle so as to keep the former continuously submerged in liquid. Predetermined amounts of slurry are metered to the receptacle and each accretion depletes substantially the entire metered amounts.

The invention here disclosed relates to the art of pulp moulding or accretion and, more particularly, to the accretion of articles wherein the fiber or other particulate matter is deliberatly varied during accretion, to a prearranged pattern.

Specifically, the present invention is concerned with the production of thick walled tubular liquid filter elements or cartridges.

The prior art manufacture of filter cartridges has, for example, closely followed the disclosures in U.S. Pats. 2,539,767 and 2,539,768 to Anderson wherein a slurry of fibrous material is prepared and deposited in a tank and therein to be accreted on a shaped foraminous forming device. It has been found impractical by such methods to provide a structure wherein the density of the filter (whether expressed in grams/cc. or in terms of pore size) could be varied by control of the accreting process, from one point to another in the depth of the object as it was built up. While there is a graduation in density, taken from the inner to the outer, or bark, surface of practically all accreted material, such graduation is inherent in the process as fiber piles on fiber and the available accreting pressure differential lessens as the deposit grows thicker and larger in circumference. The graduation is inevitably to a more and more open structure and has proved substantially uncontrollable. Further, under the prior art methods, it has been impractical to change from one fiber to another, during accretion without moving the foraminous former from its slurry bath to another such bath and causing a parting line, between successive fiber layers. Additionally, under this prior art process, it has not been practical to accurately control the weight of the accretion.

In at least one patent, Pall U.S. 3,158,532, an attempt was made to vary pore size in a body of fiber deposited from a fiber bearing slurry. Pall describes the use of programmed mixing pumps to continuously combine two or more slurries, each containing different fibers and enabling him in some undisclosed way, to form thin sheets from mixed fibers, the sheets having a maximum thickness of 3.5 mm. (just over ⅛"). This process is in fact

2 a form of batch paper making, in which a variably mixed stock is delivered to a screen. The process, regardless of the unknown fiber retaining arrangement, has a similarity to Anderson in that Pall discloses a continuous flow of a uniform fiber-bearing slurry, albeit the fibers being of varying sizes, indiscriminately to the place where forming occurs.

In the prior art processes, as exemplified by Anderson and Pall, no attention is given to feeding the slurry or slurries to the point where the particulate matter is separated, from its vehicle, nor to the tank size nor to the volume of slurry in the tank. We have, however, found the factors of tank size, the volume of fluid therein, control of slurry supply to such tank and control of the liquid level therein of the utmost importance. When these critical factors are properly manipulated, in the manufacture of thick-walled tubular structures, one may readily product items of uniquely governed weight, fiber content and pore size, which latter may be increased or decreased as desired, while accretion proceeds.

The objects of the invention comprehend:

(a) Affording a method of and apparatus for controlling the density of accretion throughout the thickness of the article so made;

(b) Providing a novel method of and apparatus for controlling the weight of an accretion;

(c) Providing apparatus wherein the deposition of the components of an article being accreted may be stopped and restarted at will, without deleterious effect on the work in process;

(d) Providing novel apparatus and methods whereby the components of an accretion may be changed during their deposition, and wherein such change may be gradual, affording no clear line of transition or, alternatively, the change may be quite abrupt but without involving a tendency to delamination;

(e) Affording a novel mode of accretion whereby an article made of a single fiber (e.g. cotton linters) may be so manipulated that the resulting object exhibits varying characteristics through the depth of deposition and wherein those characteristics conform to a pre-arranged pattern;

(f) Providing a novel form of accretor apparatus, simplifying such devices and permitting easy and effective control of the accretion process.

How these and other objects, not specifically set forth above, may be attained will become apparent from the following specification and the appended drawings, of which FIG. 1 is a schematic diagram of one form of apparatus suited to the accretion of filter elements;

FIG. 2 shows a modified and more versatile form of the apparatus of FIG. 1;

FIGS. 4 to 7 are similar to FIG. 3 but show other distributions of the components of accretions made according to this disclosure.

Figure 1:
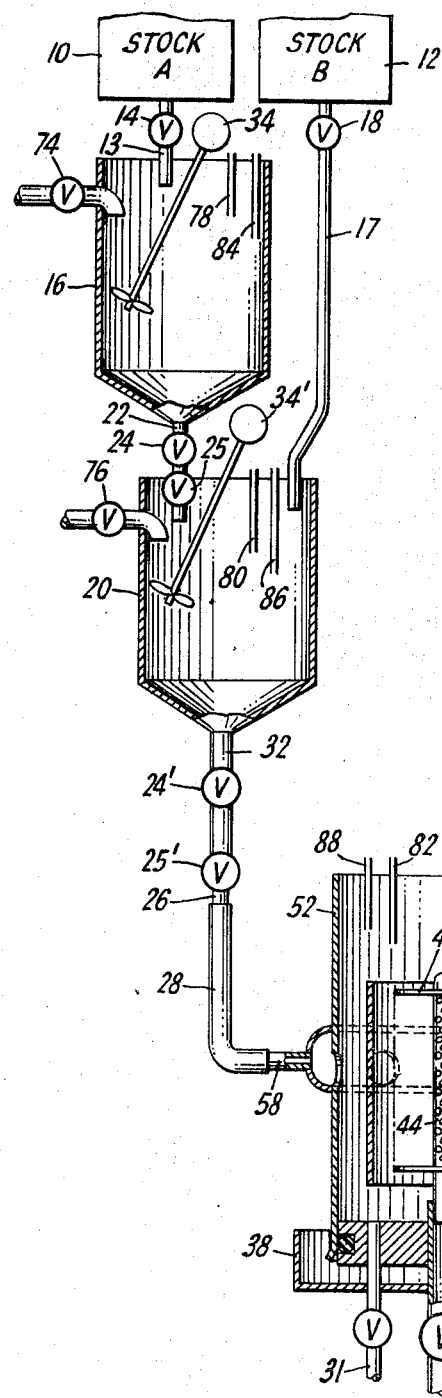

Before proceeding, it should be understood that "slurry" refers to particulate matter and a liquid vehicle in a concentration suitable for accretion; while "stock" refers to any other concentration, usually with a lower liquid to solids ratio, such as may be held in the stock chests of FIG. 1, whose function will later be explained. The distinction is arbitrary but convenient. Further, the term "preform" refers to the accreted article made in accordance with this invention prior to complete drying, curing and final finishing. "Former," "arbor" or "foraminous mould" as used herein is that mechanism having one or more bodies or portions on which the fibrous material is formed or deposited and may be of any shape, size or construction. While the present invention is disclosed with reference to the manufacture of cylindrical filter bodies, it will be clear that conical bodies such as cups, hats, radio speakers; rectangular bodies such as boxes, and containers, and shaped bodies of any description can be made by the process by merely changing the cylindrical "former" into a "former" of the desired shape and size.

The present method comprises an accretion cycle of various steps to be discussed at length. However, briefly such cycle comprises the sequential preparation and feeding of sufficient fibrous material and the forming of a body or number of bodies in predetermined and timed relationship. Both the description of the method and the apparatus herein discloses the accretion of a singular body. It will be clear, however, that the principles of preparation, feeding and accretion can be applied to the formation of a plurality of bodies simultaneously on a former or formers so provided by mere adherence to the feeding of predetermined quantities, in timed relationship and with the controlled forming step all as disclosed at length herein.

Initially, one or more stocks of different fiber characteristics are provided. Such stocks can be made by any of the known prior art processes and may preferably consist of a fibrous material, beaten and/or fibrillated into separate and distinct fibers, mixed with a liquid vehicle. Normally the vehicle is water, although other fluids such as alcohol may be used. The number and kinds of stocks will depend upon the type of accretion desired and the differing characteristics may be either in size, type or nature of the fibers, or the forms of treatment given the fiber which may render it different from other forms of the same fibers. Reference will be made, later on, specifically to one or more examples as illustrated by FIGS, 3, 4, 5, 6 and 7 which show various accretions of different fiber content.

In the second step of the present method an amount of stock containing a predetermined amount of fiber is metered from the stock reserve. It is preferred that this metered amount is stored separately, or that at least for some time during the process its separation from the larger stock is distinct. The amount of each fiber metered is predetermined to conform substantially to the amount of that fiber which will be required to form a particular body or "preform" step. It will be understood, of course, that if only one fiber is desired, for the "preform" only one stock will be so metered and if two fibers are desired, two stocks will be metered in predetermined amounts protionate to the amount of each fiber desired in the finished product, and so on. Furthermore, the total amount of fiber metered will also conform substantially to the total amount of fibers for the "preform" and utilized in the accretion step.

In the third step, each metered amount of slurry is fed in predetermined sequence to an accretion fitting tank. This sequence, of course, depends on the type and product desired but essentially requires that the fiber desired to be accreted or felted first, is fed first, the remaining fibers being fed and seriatim. It is also possible at this point, to mix either the whole or a portion of each of the slurries with any of the other slurries, to obtain a desired mixture. This, however, is not necessarily to be preferred, since such mixture can be more economically made in other ways. It is to be understood, however, that the slurries are to be preferably fed ad seriatim, the advantage of which will be apparent elsewhere in this description. It is also possible to feed the successive slurries with a gap or hiatus of indefinite length between them. As will be seen with regard to the description of the accretion step, such a hiatus is not harmful to the accretion and contrary to all the teaching of the prior art processes, does not result in lamination, separation faces or other disadvantageous structural defects between layers of the different fibers. In the preferred mode of practicing my invention, the tank, is a terminus for a slurry-bearing conduit and is shaped to conveniently house the former (or mould) on which the accretable material is deposited. It is made only as large as needed to ensure the smooth flow of slurry from its entrance to the tank to the former, and baffles or other flow distributing means may be used to further that end. The tank is also preferably connected to a source of a slurry-compatible liquid, this liquid may very conveniently be spent slurry. One may use a much larger tank than the minimal size above described, but the latter is very preferable as it offers advantages unique in the art, as will become apparent on reading further.

The felting tank wherein the final step occurs, need not be of spectacularly different construction from that known in the prior art, although in the following description, we show a tank which has distinctly novel structural features. The tank, however, is preferably of a relative size much smaller than those used heretofore, and will hereafter be referred to as a "small" tank. The "small" tank is preferably of a size to hold only the slurry and an additional amount of carrier fluid sufficient to keep the fibers in even random suspension therein and to maintain a sufficient pressure differential, vacuum differential or other differential for the successful felting operation. It will be appreciated, that the exact size of the tank cannot be stated, since it depends on the final size of the accreted body or bodies, the amount of slurry being fed to it, the rate at which it is fed and the rate at which accretion takes place. It is to be preferred that with all of these factors, as well as any other which may apply, taken into account the tank, should be as small as could be in which at most, only sufficient fibers may be maintained to complete a single cycle of accretion. The way in which the small tank is most advantageously used is as follows, and here it should be borne in mind that it is highly desirable to maintain the former (and the developing accretion) submerged in liquid from the beginning to the end of the operating cycle. A former of a convenient type is inserted in the tank and connected to a suitable drainage pipe, (e.g. a suction connection to a pump), the tank is then filled with sufficient liquid to submerge the former. The liquid may be slurry, spent slurry or other compatible liquid. When the former is completely submerged, suction is applied thereto and, simultaneously, the previously metered quantity of slurry is fed to the tank at a convenient rate; if for any reason that rate is insufficient to keep the former submerged, then other clear liquid is fed to the tank to accomplish that end. It will now be apparent that with the small tank, individual slurries, in amounts proportionate to the desired amount of material in the accretion, can be successively and selectively supplied and that maintenance of submergence of the former, by feeding a clear liquid to the tank, as desired, permits all of a separate predetermined quantity of one accretable material to be deposited before feeding the next material which is then accreted on to the first layer, without transfer of the former from one tank to another and without the creation of a bark or laminar face between successive layers of accreted material.

Further, it is possible to feed a second fiber slurry to the tank while at least some of the first fiber slurry is still in the tank. The resultant accretion will have a layer in which the two fibers are interlaced for a strong nonlaminar bond. As will be further explained, numerous variations are possible.

The accretion proceeds with successive slurries until the last slurry is substantially exhausted, leaving the tank with a completed accretion and a quantity of practically clear liquid. At this stage, the "preform" may be removed, or prior thereto, treated with resin or other fixatives, subsequently cut, shaped, dried or treated in any of the numerous prior art methods for finishing accretions.

Having thus briefly described the method of the present invention we now describe suitable apparatus for practicing this method. In the description of the apparatus further and greater detail of various methods steps will be given. It is to be understood that the description of the apparatus is not to be necessarily taken as limiting of the invention since other and equivalent apparatus may be useful.

Figure 3:
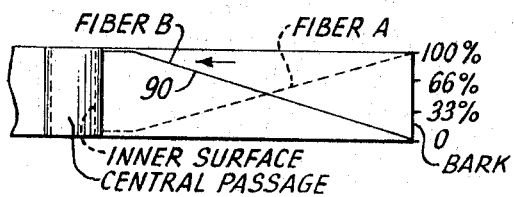
FIG. 3 is a schematic diagram showing the fiber distribution through a partial section of a thick-walled tubular filter element of the "depth filter" type.

FIG. 1 shows such apparatus wherewith thick-walled tubular filter elements may be made, comprising two different materials or materials with different characteristics, e.g. two fibers, one coarse and one fine or one of long length and one of short length distributed in a predetermined arrangement, such as that indicated in FIG. 3, which shows at any point, the proportion of one fiber to another. Referring to FIG. 3 starting at the inner surface, the solid line shows 100% of fine fibers and no coarse ones, then, at a short distance radially outward the deposition of coarse fibers beginning and increasing while the quantity of fine ones decreases until, at the outer or "bark" surface, the fiber content is wholly coarse.

Returning to FIG. 1, a stock chest 10 is provided to hold a relatively large indefinite amount of a stock of coarse fibers A, in a suitable liquid vehicle, e.g. water; this stock is hereafter on account of the fibers, called stock A. A second stock chest 12 is provided to hold a similar supply of fine fibers B, in a suitable liquid vehicle which is hereinafter called stock B. A pipe 13, with a control valve 14, affords means of discharging stock A into a tank 16 and a similarly arranged valve 18 in pipe 17 serves to discharge stock B into tank 20; these valves may be controlled manually or by any other means as is most desirable. Tanks 16 and 20, as hereinafter described, unlike chests A and B, are equipped to hold specific metered amounts of slurries. A pipe 22 leads from tank 16 to tank 20 and flow therethrough is controlled by a valve means comprising a shut-off valve 24 and/or an adjustable flow regulating valve 25. Another pipe 26 leads, via a flexible portion 28, to the accretion tank 30 and valve means 24' and 25' similar to valves 24 and 25 control fluid flow from tank 20 to the accretion tank 30. It should be noted that the valve 24' is located at some distance below tank 20 and affords a small chamber 32 having a purpose that will be later explained. Agitators of any desirable type, as indicated at 34 and 34' are preferably installed in tanks 16 and 20.

To accompany the metered supply tanks 16 and 20, there is provided an accretor different from that shown in the aforementioned Anderson patent. This tank is preferable although not absolutely essential to the operation of the present invention. The accretor 30 comprises fixed base 36 which may be carried on or over a catch basin 38 having a drainage duct 40. A suction pipe 42 leads to a source of subatmospheric pressure, such as an evacuating pump (not shown) and flow through pipe 42 is controlled by a valve 42'. A foraminous mould or former 44, of any suitable construction for the objects to be accreted, is secured to the pipe 42. In the embodiment of the invention here exemplified, the former would be a foraminous metallic tube of a diameter similar to the inside diameter of the thick-walled tube to be accreted and would be furnished with a pair of flanges 46 and 48 wherewith the end faces of the accretion (indicated by broken lines 50) would be defined. The upper flange 48 should be easily separable from the former 44 to permit removal of the accretion 50. Additionally, the accretor 30 comprises a cylindrical shell 52 which is supported (by any convenient means not shown) on and readily removable from the base 36, the joint between the parts is preferably sealed by an O-ring gasket 54, although other types of gaskets are quite suitable.

The shell 52 is encircled by a distributor or duct 56 to which one end of the flexible hose 28 is attached via connection 58. A series of ports 60 affords access between the said duct and the interior cavity 62, described by base 36 and shell 52. The ports 60 are, in the present instance, located at about midheight of the part to be accreted. A hollow substantially cylindrical baffle 64, which may be a sheet metal tube, is carried on brackets such as those indicated at 66 to form a concentric wall about the accretion. The baffle 64 prevents incoming slurry from impinging directly on the accretion 50 and, at the same time, evenly distributes such slurry over the length of the former 44 and affords a uniform distribution of accretable matter thereon.

A second connection 68 is provided for the attachment of a flexible line 70 which extends to a valve 72 for supplying a slurry-compatible fluid, e.g. water or spent slurry. Water may also be supplied to tanks 16 and 20 by valves 74 and 76 respectively. Water level sensors or probes, as indicated schematically at 78, 80 and 82 are provided in the tanks 16 and 20 and accretor 30 respectively. Generally similar probes 84, 86 and 88 are provided to respond to the slurry level in the said tanks and accretor. These probes are used in controlling the slurry levels in the receptacles concerned in order to insure consistent metering. "Controlling" as used here may mean giving a suitable signal calling for the manual operation of the various valves or may mean regulation of power driven means which operate them. All of the probes are preferably vertically adjustable in their receptacles.

The operation of the present method and apparatus begins with the filling of the accretor 30 with an amount of suitable clear liquid, water for instance, supplied through pipe 70. Suction is applied through former 44, on which the accretion is to be built through pipe 42 and valve 42'. Meanwhile, a predetermined amount of each stock, which in total is sufficient only for one accreting cycle, is fed into tanks 16 and 20 from stock chests A and B. The slurries are subsequently delivered to accretor 30 by selective operation of valves 25 and 25' via pipe 28. The operation of valves 25 and 25' permit the selective, controlled and variably sequential time and rate of flow of separate or combined slurries to the accretor 30.

The total amount of liquid and slurry in accretor 30 is, of course, easily controllable through input valves 72 and drain valve 31, as well as flow valves 25 and 25' as well as suction valve 42'. For example, if valves 25 and 25' are set to allow twice as much slurry to flow from tank 20, in a given time, as flow into it from tank 16, the initial material discharged into pipe 28 will be 100% of slurry B but with the flow of slurry A from tank 16 to tank 20 the proportions will change continuously during the cycle and finally become substantially 100% slurry A. An accretion such as shown in FIG. 3 would result from such manipulation. Adjustment of relative flow rates or of the ratio of quantities of slurries in the tanks can be used to vary the fiber distribution in an infinite number of patterns of which FIGS. 3–7 are illustrative.

In prior art practice the former, such as 44, is immersed into a slurry bath and withdrawn when sufficient material has been accreted; here, instead, the former 44 is placed in an empty tank immersed in the bath of clear fluid and a pre-metered, pre-controlled slurry (both in timing consistency and flow rate) is fed into the bath. As the quantity of slurry fed to the bath is only sufficient for one accretion cycle, which is preferably continued by the application of suction until substantially all accretable material is deposited on the former, the process provides articles of very closely controlled weight and size and internal configuration. During the final moment of accretion, when the tanks 16 and 20 have been emptied, water, introduced via valve 72, will keep the bath in the accretor 30 up to its minimum level and the accretion wet.

When accretion is complete and the fibers in the accretor 30 have been deposited on former 44, all fluids are cut-off and the accretor 30 drained through valve 31. Thereafter, the shell 52 along with baffle 64 and, if desired, flange 48, may be raised by any convenient means well known to those skilled in the art to afford access to the accretion 50 for its removal and subsequent treatment.

Alternatively, the former 44 may be elevated from the bath after accretion is complete also by means well known in the art but the first mentioned method is preferred as it makes it possible to rid the accretion of all excess fluid before moving it; this greatly reduces the danger of cracking or of sloughing off some of the fibers.

Figure 4:
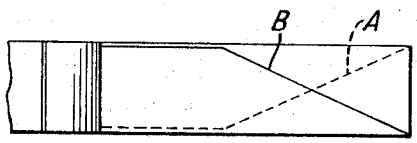

Referring now to the chamber 32 at the base of tank 20; it is proportioned to insure that there will be enough undiluted slurry B to make the zone fiber indicated at 90 in FIG. 3 which zone, being on the inner face of a radial inward flow cartridge determines its density rating. The same result may be achieved by opening valve 24′ ahead of valve 24 but this, generally speaking, is not quite so convenient as the use of a chamber such as 32 because it entails close timing of the valves. If, however, it is desired to make the single fiber zone of considerable volume it may then be more convenient to utilize valve timing as a control. A diagram of such an accretion is shown in FIG. 4, and would be of interest where a fluid being filtered had a large proportion of particles close to the minimum size to be removed. The examples of controlled graded density covered by FIGS. 3 and 4 show novel structures that are quite easily made by using the relatively small accreting tank to which the material to be used is supplied in controlled quantities at whatever rate may be convenient in accordance with this disclosure.

As earlier mentioned, probes are fitted to the tanks 16 and 20 and to accretor 30. They may be used to control slurry and other fluid levels and such use will now be explained. In accretor 30 the slurry probe 88 controls the slurry valves 24 and 24′ so as to maintain the slurry level at a convenient height so long as the supply (for one cycle) lasts. The fluid probe 82 which controls valve 72 is set somewhat lower than the slurry probe 88 but above the top of the former 44 so as to maintain a level of fluid which will prevent the accretion from going dry at an inappropriate time. In the tanks 16 and 20 the slurry probes 84 and 86 serve to control the stock chest valves 14 and 18 respectively so that only a predetermined amount of slurry will be fed to each tank. The fluid level probes 78 and 80 are arranged to control fluid level valves 74 and 76 respectively; their provision is not essential but either may be used to dilute the slurry in its associated tank. Having a given slurry charge in a tank, the duration of feed toward the accretor, for a given flow rate valve setting, may be extended by adding a dilutant which will reduce the accretable material flow rate; in effect dilution may be used to effect a fine feed rate adjustment. Additionally, fluid may be used for cleaning the tanks and accretor.

Figure 5:
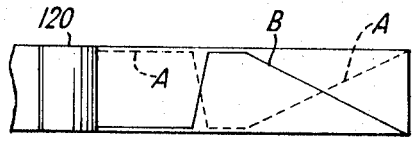

The apparatus of FIG. 2 is essentially that of FIG. 1 which has been changed in the material feeding components to enable structures such as those schematically shown in FIGS. 5, 6 and 7 to be made, as well as those previously described.

This is accomplished by providing a third slurry C and cross-overs and by-pass conduits as further explained. With this apparatus the structure of FIG. 5 for example may be made with an initial layer of fibers A followed by an abrupt change to a layer of fiber B to which, after a period of time, is gradually added an increasing quantity of fibers A. This provides a filter having larger exit area with fibers A than is afforded by the dimensionally similar devices of FIGS. 3 and 4, and offers a lower resistance to flow if all other things are equal. FIG. 6 shows a construction also possible using the apparatus of FIG. 2 wherein relatively physically weak filtering fibers of differing finenesses, indicated by A and B, which are arranged and accreted similarly to those of FIG. 3, are protected (i.e. clad) by an inner and outer layer of physically strong fibers indicated by C which may, or may not, as is most convenient, have filtering functions, but which do provide mechanical support. FIG. 7 shows another structure having three components arranged sequentially with abrupt changes from one material to the next.

Turning specifically to FIG. 2; the parts which are common to FIG. 1 have like numbers and functions. The tank 16, for receiving slurry A, is arranged for its contents to be passed through tank 20 for selective blending with slurry B (as earlier described) or to be passed around tank 20, via shut-off and flow regulating valves 24b and 25b and line 92 to line 26 below valves 24′ and 25′. The quantity of slurry A passed through line 92 is controllable; a standpipe 94 is located within tank 16a, it has a valve 96 adjacent the bottom of the said tank which may be opened or closed by a link 98 and is shown open in the drawings. At the top of the stand-pipe 94 is a vertically adjustable sleeve 100. If only a relatively small portion of slurry A is to be fed around tank 20, the valve 96 will be closed and sleeve 100 set at a suitable height below the upper level of the slurry A so that only the slurry above the top of the said sleeve may pass into the stand-pipe 94 and through it to line 92. If valve 96 is open substantially all the contents of tank 16a may be fed to line 92 and thence direct to accretor 30. It would, of course, be possible to omit stand-pipe 94 and valve 96 entirely and control the flow through line 92 by manipulating valves 24b and 25b. A third stock chest, similar to stock chests 10 and 12, 102, is provided which holds a slurry of other fibers C and which is hereinafter called slurry C. Also provided is a third tank 16b which is preferably a duplicate of tank 16a and is similarly equipped with stand-pipe 94a, valve 96a valve control link 98a and vertically adjustable sleeve 100a. Tank 16b is also connected into the system in the same way as is tank 16a, which is done by pipe 22a leading into tank 20 and by line 92a leading into line 26; flow through these is controllable, as before, by shut-off valves 24c and 24d which are used in conjunction with flow rate regulating valves 25c and 25d. Slurry C is fed, in desired amounts, to tank 16b through pipe 104 and valve 106. A pair of vertically adjustable level sensing probes is furnished, one, 118, being responsive to water level and arranged to control water valve 110, the other probe, 112, being sensitive to the slurry level and arranged to control valve 106.

Apparatus of FIG. 2. Outline of operation. As already said, this is essentially the device of FIG. 1, modified to handle a third slurry C, and to permit or to avoid the blending processes earlier described. If used for making articles according to FIGS. 3 and 4, operation would preferably be exactly as has been explained, without using valves 24b and 25b and tank 16b with its associated gear. To make the structure of FIG. 5, for example, the accretor 30 will be filled with water and after suction had been turned on by opening valve 42′ a sufficient amount of slurry A would be passed down line 92 to the accretor to make the inner zone of coarse fiber, the amount being controlled by use of the stand-pipe adjusting sleeve 100. After the slurry A so fed to the accretor had been deposited onto the former 44, slurry B together with slurry A would be fed to the accretor in the manner described in connection with FIG. 3. Should it be desired to make a less abrupt transition from coarse to fine fibers than that indicated in FIG. 5 it would only be necessary to initiate slurry flow from tank 20 before the supply of slurry fed via line 92 was entirely accreted. Timing and relative flow rates would govern the extent of the zone of transition from one fiber to the other. To make the previously described article of FIG. 6, stock chest 10 would contain a slurry of coarse fibers A, stock chest 12 would have a slurry of fine fibers B while stock chest 102 would hold slurry C of the strong fibers required, and suitable charges of each slurry would be fed into tanks 16a, 20 and 16b respectively. As in the previous cases, the accretor 30 would be filled with water fed through valve 72 to the level limited by probe 82 and suction turned on to former 44 by opening valve 42'. Next, with controlling valve 25d adjusted for a convenient flow rate, valve 24d would be opened for a period sufficient to pass into the accretor 30 the quantity of slurry needed to make the inner zone of strong fibers C. The valve 24d would then be closed and when all of the material just fed to the accretor had been deposited into the former 44 the valves 24, 25, 24' and 25' controlling the accretion of slurries A and B would be manipulated as earlier described in connection with FIG. 3. When all of the materials of the two latter slurries had been accreted, the remainder of the contents of tank 16b would be directed to the accretor to deposit the outer layer of strong fibers C; on completion of this step the water valve 72 would be closed, the accretor drain 31 would be opened; thereafter the shell 52 with its associated baffle would be raised clear to permit removal of the accretion subsequent to closing valve 42'.

Reference to FIG. 7 will show that it comprises three layers or zones of different fibers with abrupt transitions from one zone to the next. In making this, the three tanks 16a, 20 and 16b would each receive, from their respective stock chests, sufficient of the slurries for one accreting cycle. After the accretor 30 has been filled with water, which will be maintained at a desired level by the probe 82 controlling valve 72, suction may be applied to former 44 by opening valve 42'. Then, with valve 96a open, shut-off 24d will be opened to allow slurry C to pass to the accretor. When all of fibers C have been deposited onto former 44, the shut-off valve 24' may be opened and slurry B passed to the accretor and, after that stage of accretion is finished, slurry A may pass through valve 96 and, with shut-off valve 24b opened, proceed through line 92 and on to the accretor to the zone of fiber A. Valve 72, under the control of probe 82, will prevent the fluid level in the accretor falling below a desired height. The accretion will not go dry during the process even though there may be an appreciable lapse of time between ending the accretion of one fiber and starting of accretion of the next. While there is, in this case, no blending of fibers, as in the case of the article of FIG. 3, there will be no tendency to delamination as the fibers during the operation will maintain the structure on their outer surface which is characteristic of them throughout the whole body. Only if the surface were allowed to go dry would there be an area prone to delamination.

As earlier explained, stock and fluid probes 78, 80, 84 and 86 may control the quantity of contents in tanks 16 and 20 admitted for a single charge and a liquid diluent may be used as desired. These features have at least two commercially important aspects. In prior art practice, it has been customary to hold the stock in the stock chests and in the accreting tank at the same liquid to material ratio. As the liquid to accretable material ratio is very large, the tanks used have been of great size. However, in the present instance, the stock in the chests may be relatively concentrated; this reduces the size of the chests necessary. The liquid diluent needed may be introduced into the tanks 16 and 20 to obtain the optimum concentration and then after passing through the former (44) having a volume needed for only one accretion cycle may be held for reuse. The size of tanks 16 and 20 are, as said, only large enough to hold slurry for one accreting cycle, the accretor merely holds sufficient slurry, at any moment, to keep fluid flow velocities down to a reasonable figure. Thus the equipment need only be a fraction of the size of the conventional structures. By these means, it is implicit that the invention effects great savings in equipment, space and the strength of the structures in which they are housed. There is also possible a great saving of liquid, usually water, and, where resin impregnation is practiced concurrent with accretion, there is a great economy as it is substantially all recycled. Additionally, as the quantity of resin used in the recycling process is relatively small, little is lost by aging.

The following examples are included to demonstrate the operation of the present process and apparatus and the various results obtainable. It will be noted that all the objects and advantages previously enumerated as well as some not enumerated are here exposed.

EXAMPLE 1

In the following example, filter cartridges of the invention were made by mixing fine and coarse fiber slurries in progressively changing ratios and adding portions of these mixes to the small felting tank, during felting, to be deposited responsively.

Control cartridges were also made from the gross mixture of the fine and coarse slurries, using conventional methods, for comparison.

The example illustrates that the conventional large felting tank cannot responsively deposit changing stock ratios in the accreting felt, while the small tank can. The example also demonstrates that the method of the invention holds the felt weights of the cartridges more closely; that it forms a more precise filter; and that the dirt holding of the filter cartridge (and therefore its life) is greatly increased.

The stock formulation was, on a dry basis by weight,

| | Percent |
|---|---|
| Hercules SFP fiber | 25.0 |
| Alberni kraft | 3.5 |
| 40 denier rayon | 71.5 |
| | 100.0 |

Hercules SFP (Hercules, Wilmington, Del.) is a modified 2nd cut cotton linter fiber 12 to 16 microns in diameter and 2 to 6 mm. long. Its use in this proportion makes a 30 to 40 micron filter. The Alberni is a West Canada unbleached kraft fiber 15 to 20 microns in diameter and 3 to 8 mm. long. The kraft gives the fibrous composition "green" strength. The 40 denier viscose rayon is 55 to 65 microns in diameter, and was cut in the paper makers beater to 6 to 12 mm. before use. This coarse fiber provides good flow and dirt holding in the final cartridge.

The control cartridges A were made in a conventional felting tank operating at 0.6% consistency. The tank was 4 by 4 by 4 feet and was filled to a depth of 3½ feet, i.e., 420 gallons. The felting tool was a perforated metal mandrel one inch in diameter and 12 inches long. End flanges of the felted cartridge diameter were set elevent inches apart on the mandrel. The tool was lowered, with vacuum applied, for 35 seconds into the stock slurry. This period of accretion had been established as giving the desired dry weight felt of 160 grams. Four cartridges made weight 165.5, 145.8, 155.0 and 159.5 grams respectively. This variance is typical and represents one of the problems of pulp molding. It is particularly troublesome when the preform being made is to be molded in solid dies.

The dried cartridges were impregnated with phenolic resin, 39–42% resin dry basis, cured and trimmed to the final shape, 9¾ inches long and 2¾ inches in diameter. This cartridge is flowed from the outside to the inside with the effluent passing out through the one inch hole in the center. The cartridges were given standard tests as shown in the chart below.

The improved cartridges B of the invention were felted on the same perforated metal mandrel with the end flanges set as before. The conventional felting tank, however, was not used. Instead, apparatus of the type previously described and shown in FIGS. 1 and 2 was used. A cylinder was set over the felting tool to contain the slurry. The cylinder was 9 inches in diameter and 24 inches high. A drilled circular tube was fastened to the inside bottom of the cylinder to permit water to be brought in smoothly during felting. In addition, a one inch vane or baffle was taken up the inside of the cylinder to stop the swirl caused by the water addition.

40 grams of Hercules SFP, dry basis, at 0.25% consistency was weighed into a bucket. 120 grams, dry basis, of 40 denier rayon 95% to Alberni kraft 5% at 0.4% consistency was weighed into another bucket. The buckets were provided with stirrers. At the start of the felting two quarts of fine stock were added to the cylinder which contained enough water to cover the felting mandrel. The water flow into the cylinder was regulated to keep the mandrel submerged. A quart of coarse stock was added to the fine stock bucket. After mixing took place, a quart of the mix was added to the cylinder. Another quart of coarse stock was added to the "fine" bucket, etc. As this procedure was followed, the stock in the coarse bucket was used up and the stock in the "fine" bucket became more and more coarse. These changes were reproduced in the fibers deposited in the accreting felt. The first layer of the cartridge, the filter bottom, was wholly fine fiber, with no intrusion of coarse. As the felt thickened it became richer in the coarse fiber. Thus the filter bottom is made to a precise formula of filter fibers, while the outer layers of the cartridge are opened especially to allow coarse dirt to enter. It will be recognized that in the ordinary process, as disclosed by the aforementioned Anderson patent, coarse and fine fibers deposit together in the filter bottom so that a wide variety of uncontrolled pore sizes is created. This same mix of coarse and fine is accreted in the outer layers, thus reducing pore size desired at the point that coarse dirt should enter.

The cartridges made by this method were felted slowly, taking two minutes. This was done deliberately so that the cylinder cleared of stock between each addition. This spacing of the additions with clear water flow proved that the layers of fiber went on the cartridge in exactly the ratio in which they were mixed. However, since the felt was never allowed to break water or go dry, no part lines were introduced; i.e., fiber interlacing was continuous.

Several cartridges were made. The dry weights were 158.0, 160.3, 159.8 and 161.4 grams. This improvement in holding the weight uniform comes from the method of metering or weighing out the slurries, and then felting all the fiber which was weighed out. The cartridges were impregnated, cured, finished and tested.

As an additional control experiment, the large conventional felting tank was filled with clear water and the same bucket addition of pulp carried out. It proved to take hours to completely clear the tank of fiber, but it was found that felting beyond eight minutes produced no additional benefits, so that the completed cartridges in fact averaged in characteristics to those in the cartridge A.

The cartridges were tested as follows. They were thoroughly wet out by pumping for 5 minutes at ½ gallon per minute in distilled water. Two grams of glass beads dispersed in two liters of distilled water (one gram of Superbrite glass beads #380 and one of #150 as made by Minnesota Mining and Manufacturing Co. of St. Paul, Minn.) were passed through the cartridge followed by a rinse of one liter of water. The three liters were then filtered through an 0.8 micron membrane filter and the beads caught sized under the microscope. The largest bead present in considerable amounts is rated *Nominal* and the largest bead seen is rated *Maximum*. The flow-pressure drop curve, corrected for housing loss, was run. The cartridges were then tested for dirt holding. Each cartridge was flowed at 3 gallons per minute, while Arizona Coarse Dust (in slurry form) was added at the rate of 5 grams per minute. The cartridge is rated plugged when the pressure drop increases by 20 p.s.i.

Arizona Coarse Dust is supplied by the A.C. Spark Plug Division of General Motors Corp., Flint, Mich. The particle size is—

| Microns: | Wt. percent |
|---|---|
| 0–5 | 12 |
| 5–10 | 12 |
| 10–20 | 14 |
| 20–40 | 23 |
| 40–80 | 30 |
| 80–200 | 9 |

TEST RESULTS

| Cartridge | Flow, g.p.m. at 1 p.s.i. | Degree of filtration (microns) | | Dirt holding (grams) |
|---|---|---|---|---|
| | | Nominal | Maximum | |
| A Conventional | 11.3 | 35 | 55 | 80 |
| B Of invention | 11.3 | 31 | 36 | 170 |
| C Dilute, large tank | 10.8 | 40 | 60 | 50 |

It is evident from this data that cartridge B, as made by the invention, had the best filter bottom, both for degree of filtration and spread between nominal and maximum. This is to be expected because it is made without intrusion of coarse fibers. Again, cartridge B is improved in respect to dirt holding because the larger fibers placed on the outside allow the coarse dirt to enter and thus stave off the time at which the flow-stopping filter cake forms.

In summary, the weight of the cartridge has been more closely controlled, the precision of filtration has been improved and the dirt holding greatly increased.

EXAMPLE 2

The method of the present invention makes it possible to manipulate the structure of the cylindrical filter cartridge of Example #1 to improve flow. The dense ⅛" layer at the inner diameter or downstream side of the cartridge accounts for about half of the pressure drop in the clean cartridge. If this layer is moved to the center of the filter wall, its area is increased approximately three times. This means that the total pressure drop can be decreased by about one-third, without changing the degree of filtration. The following example illustrates this technique.

Stock additions follow the general procedures of Example #1, except that half of the coarse stock is felted out at the start to provide the base on which the increased area fine filter layer is laid.

The fiber mixes were the same as in Example #1, with 40 grams of Hercules SFP, dry basis, at 0.25% consistency weighed into the "fine" bucket. Sixty (60) grams, dry basis of the 40 denier 95% Alberni Kraft 5% mix at 0.2% consistency were weighed into the "coarse" bucket. Water flow was regulated to the felting cylinder to keep the felting mandrel submerged during the felting cycle.

Sixty (60) grams, dry basis, of the rayon Alberni mix were run into the cylinder and felted out. Two quarts of fine stock were next added to the cylinder and felted. One quart of coarse stock was then transferred to the "fine" bucket, with stirring, and another quart added to the cylinder, etc. (procedure as in Example #1). The final fibers deposited on the outside of the cartridge were coarse.

The cartridge was dried, impregnated, cured, finished and tested as in Example #1.

TEST RESULTS

| Cartridge | Flow, g.p.m. at 1 p.s.i.[1] | Degree of filtration (microns) | | Dirt holding (grams) |
|---|---|---|---|---|
| | | Nominal | Maximum | |
| Example #1, B cartridge | 11.3 | 31 | 36 | 170 |
| This example, cartridge | 14.5 | 31 | 37 | 130 |

[1] Corrected for housing loss.

The expected increase in flow is obtained. Since there is now less cartridge wall outside the fine filter layer, it is understandable that dirt holding should be decreased. The new cartridge would represent an improvement for lubricating oil service where good flow is desired, and the dirt load is usually low.

When the cartridge of the example was sawed into thin slices and these examined in transmitted light, the fine filter layer midway in the wall could readily be seen.

Similar manipulation of fibers can be used to surface pulp moldings to improve their appearance.

EXAMPLE 3

The cartridge of the invention, as made in Example #1, was felted slowly, and the small felting tank, which was supplied with water to cover the felting mandrel, was allowed to go clear between stock additions. The fine stock, Hercules SFP, gives 30–35 micron filtration and the coarse stock, 40-denier rayon, 95% to Alberni Kraft 5%, gives 160–180 micron filtration. The mixes as made and felted, therefore, gave a "stair step" pattern in pore size in the accreted cartridge.

If the stock additions are made more rapidly, when substantially all the stock has felted out, but before the water has cleared, the steps will be "rounded" but otherwise the same. The cartridge made will be essentially the same, therefore, but much more rapid felting can be carried out.

Accordingly, Cartridge B of Example #1 was rerun, with the stock additions made after 70–90% of the previous addition had been felted out. This brought the felting time from two minutes down to 45 seconds. The cylinder was lifted from the cartridge, i.e., the tank was drained while 10% of the last addition had not been felted out.

TEST RESULTS

| Cartridge | Flow, g.p.m. at 1 p.s.i.[1] | Degree of filtration (microns) | | Dirt holding (grams) |
|---|---|---|---|---|
| | | Nominal | Maximum | |
| Example #1, B cartridge | 11.3 | 31 | 36 | 170 |
| This example, cartridge | 11.5 | 31 | 38 | 200 |

[1] Corrected for housing loss.

The results show that fast felting gives essentially the same cartridge.

EXAMPLE 4

This example illustrates the method of the invention operated with continuous mixing of coarse and fine fibers, and continuous flow to the small felting tank, using the apparatus of FIG. #1.

The tank was a cylinder 19 inches high and 7 inches in diameter. The inner baffle was 10¾ inches high and 6 inches in diameter. The felting mandrel was perforated metal, 12 inches long and 1 inch in diameter. The end flanges were set 10 inches apart. This assembly was placed symmetrically in relation to the baffle.

As FIG. #1 shows, the fiber slurry was fed to the midsection of the small tank through four inlets. The flow then splits, half going up over the top of the baffle, and half going down and under it to felt.

The fibers of Example #1 were used. The fine fiber was 40 grams of Hercules SFP in 12 gallons of water. This was placed in Container B of FIG. 1. The coarse fiber was 40 denier rayon 95% Alberni Kraft 5%. One hundred twenty (120) grams of this mix in 12 gallons of water was placed in Container A. Flow rates were adjusted so that the outlet to B was flowing at twice the rate of the outlet to A, i.e., the containers A and B went dry at the same time.

Felting was started with water in a small felting cylinder to cover the felting mandrel. Stock was then run in at such a rate that no further water addition was required to keep the felter submerged. The last of the slurry was drained through valve 31 when the felted cartridge broke "water."

The cartridge, the same in size as made in Example #1, was felted in 48 seconds, dried, impregnated with resin, cured and finished. It tested as a match to Cartridge B of Example #1 which shows the validity of the continuous method.

The felting rate was 0.5 gallon per second or 115 cubic inches/second. This flow in the two inch ID pipe from Tank B has a velocity of 37 inches per second, and through each of the four ports, 9.2 inches per second.

On entering the larger annular area, flow drops so sharply that it can be assumed that the flow upwards (or downwards) around the baffle starts simultaneously.

The flow which follows the baffle up goes over the baffle first. That which follows the cylinder wall up must cross the annular width at the low annular velocity. This brings different stages of the varying mix together, and constitutes a miscarriage of the process. This is more serious in large than in small tanks. In the table which follows, baffle dimension is held constant while tank size is increased.

In the following table, we show this example duplicated with tanks of varying diameter to indicate the dimension the "small" tank might take in order to deposit sequentially pulp accretion:

| Tank diameter (in.) | Cross annular distance (in.) | Annular area (sq. in.) | Velocity of stock rise in annulars (in./sec.) | Seconds for stock to reach the top (5 in.) | Extra time to cross annular distance (sec.) |
|---|---|---|---|---|---|
| 7 | 0.5 | 10.1 | 5.74 | 0.87 | 0.09 |
| 8 | 1.0 | 22.0 | 2.62 | 1.9 | 0.38 |
| 9 | 1.5 | 35.4 | 1.63 | 3.1 | 0.92 |
| 10 | 2.0 | 50.4 | 1.14 | 4.4 | 1.75 |
| 11 | 2.5 | 66.7 | 0.86 | 5.8 | 2.80 |
| 12 | 3.0 | 78.5 | 0.73 | 6.8 | 4.14 |
| 15 | 4.5 | 85.0 | 0.68 | 7.3 | 6.65 |
| 20 | 7.0 | 286.0 | 0.20 | 24.7 | 31.80 |
| 21 | 7.5 | 317.0 | 0.18 | 27.5 | 41.20 |
| 22 | 8.0 | 353.0 | 0.16 | 30.5 | 48.8 |

From the table, consider the largest tank shown at 22 inches in diameter. This is, of course, much smaller, approximately only 4 cubic feet in volume, than conventional felting tanks which run upwards from 64 cubic feet for the production of the same type of article. Stock flow which follows the baffle will take 30.5 seconds to reach the top of the baffle and will deposit fine fiber on the mandrel correctly, phase into coarse fiber and be exhausted in 48 seconds, or a total of 78.5 seconds.

Stock flow following the cylinder wall will take 30.5 seconds to reach the top and then 48.8 seconds to cross the baffle, i.e., it will be delivering fine fiber at 79.3 seconds while the baffle directed flow is coarse. In 79.3 +48=119.3 seconds it will have phased to coarse fiber and will have been exhausted. Intermediate flow points will fall between these extremes.

This shows that the cartridge will correctly start with fine fiber and correctly end with coarse fiber, but the mid-range will simply be an averaged mix of coarse and fine with the distinctive mixing method of the invention essentially blurred out.

From the table, any tank over 9 inches could be commercially discarded, since even this size increases felting time by 4 seconds while putting "1.7 seconds" of blurred mixing into the process. The 7 inch tank is certainly best of all those shown and might well be made smaller.

This simplified treatment neglects eddy currents and turbulences which would further disruptively mingle stock "distinctions" which are only 0.16 inch per second of vertical flow in the 22 inch diameter tank. They would not seriously affect the 5.74 inch height distinctions in the 7 inch tank.

EXAMPLE 5

Sieve filters tend to form filter cakes and to plug very rapidly with a relatively small dirt load. A graded density cartridge separates and segregates dirt according to particle size and packs it in depth. This prevents the formation of a flow-impeding filter cake until a high dirt load has been accumulated.

Graded density filters may, however, be mismatched to the fluid being filtered so that their proper life is not realized. Thus, if the outer portion of the cartridge is not open enough a filter cake will build there. Or, if the outside of the cartridge is too open, the dirt will concentrate at the core and shut off flow. Ideally, the cartridge should be constructed for the contaminant which it is to remove.

The following series was run to find the optimum dirt holding for a 27 micron nominal filter removing Arizona coarse dust.

To make the 27 micron filter "bottom," the fine stock was 75% Hercules SFP and 25% Esparto, by weight. Esparto fibers are 14 mm. in length and 6 to 10 microns in diameter. They, thus act to make a finer filter than straight SFP (which is described in Example #1).

The coarse fiber was 95% 40-denier rayon 5% Alberni Kraft.

The fine fiber slurry was metered into Tank B, FIG. 1, and the volume made to 12 gallons. The coarse fiber was put in Tank A and the volume adjusted to 12 gallons. Total stock taken, on a dry basis, was 160 grams.

Felting was carried out as in Example 4.

The cartridges were finished and tested as described in Example 1. The following chart shows the effect of varying the proportion of fine stock on the dirt holding.

| Dry weight fine stock (grams) | Degree of filtration (microns) | | Dirt holding (grams) |
| --- | --- | --- | --- |
| | Nominal | Maximum | |
| 30 | 27.0 | 34.0 | 112 |
| 35 | 26.5 | 34.1 | 164 |
| 40 | 26.5 | 34.5 | 189 |
| 45 | 27.0 | 34.0 | 165 |
| 50 | 26.5 | 34.0 | 146 |

This shows that the optimum dirt holding for Arizona coarse dust was obtained at 40 grams of the fine slurry.

EXAMPLE 6

This example illustrates that the method of the invention can be used to program the accretion of one type of fiber which has been prepared in different sizes and lengths.

A high rigidity 15-denier viscose rayon fiber was used in this demonstration. Such a rigid type of fiber is useful in holding a filter mat open and giving good flow. At the same time it tends to make the degree of filtration quite open.

It is desired to make a filter retaining as much flow as possible, while bringing the filter to a more acceptable micron rating.

The fiber was slurried with dispersed Alberni Kraft, using 95% rayon to 5% Alberni. The kraft holds the wet fibrous composition together. Two (2) parts cationic wet strength resin, dry basis, was added to improve the strength of the composition after drying and before resination. The Alberni fiber is described in Example 1. The 15 denier rayon was 6 to 9 min. in length and 32–40 microns in diameter.

The slurry was divided, and half was cut in a papermaker beater for six minutes. Microscopic examination showed that the fiber had been reduced in this process to 2–3 millimeters in length, with a certain amount of debris formed. The fibers were also more pliable. Cartridges were felted out of the original fiber slurry and out of a 50 original-50 cut fiber mix using conventional methods. Cartridges were also felted, usin the method of the invention and the apparatus of FIG. 1 with coarse fiber in container A and fine fiber in B. The volumes and mixing rate were as described in Example 4, with the ratio of 50 coarse to 50 cut fiber maintained.

The cartridges were dried, resin impregnated, cured, and finished as described in Example 1. The test results are shown in the following chart.

| Cartridge | Flow rate, g.p.m.[1] | Degree of filtration (microns) | | Dirt holding (grams) |
| --- | --- | --- | --- | --- |
| | | Nominal | Maximum | |
| 15-denier rayon, conventional | 16.75 | 80 | 95 | 400 |
| 40 cut-50 uncut conventional | 15.2 | 55 | 60 | 190 |
| 50 cut-50 uncut method of the invention | 14.9 | 45 | 55 | 280 |

[1] Correct for housing loss.

The uncut fiber has made a very open filter cartridge. The dirt holding figure is deceptive, since most of the dirt is simply going through the cartridge. Cutting the fiber improves the degree of filtration. The method of the invention is seen to make the best blend of the cut fiber, both for degree of filtration and dirt holding.

EXAMPLE 7

It is well known to make bowls and trays by pulp molding and drying preforms which are then molded. Ordinarily, three preforms are assembled in the die. The outer preforms are high in resin to give the molding good finish and good wear. The center preform is low in resin. This gives toughness and low cost.

The three preforms require three different size felting dies so that they will fit together properly. No matter how well they are initially fitted, however, after drying the fit is not good. Preforms often wrinkle on assembly and tear on molding, thus making rejects.

In the method of the invention, the three functional layers are combined into one preform with no part lines, yet changing in composition equivalent to the stacked trays. The fitting problem is eliminated.

It was desired to make a preform for a mixing bowl which approximated a half sphere of eight inches in diameter. The felting form was placed at the bottom of a cylinder 12 inches in diameter and 14 inches deep and supplied with vacuum. A six inch diameter plastic disc was fastened centrally one inch below the top of the small felting tank. The stock slurries were flowed onto this disc and dropped from there into the felting cylinder.

To make the bowl the apparatus of FIG. #2 was used. The surfacing resin-fiber stock was placed in tank A and metered to the top supply tank 16a. The core resin fiber stock was placed in tank B and metered into the lower tank 20.

The top tank was half felted out, using the stand pipe system as shown. The feed to the small felting tank was then phased over to the core slurry from the lower tank. When this slurry was exhausted, the flow was phased back to the remainder of the surfacing fiber slurry in tank 16a.

Tank 16a held the high resin fiber slurry containing 100 grams (dry basis) at 0.2% consistency:

| | Percent |
| --- | --- |
| Cotton linters | 15 |
| Bleached kraft | 25 |
| Dispersed titanium dioxide | 5 |
| Phenolic resin powder (one step) | 55 |

Fifty (50) grams of this was felted before the core slurry and 50 grams after. The lower tank which held the core slurry contained 300 grams (dry basis) of a slurry at 0.4% consistency.

| | Percent |
| --- | --- |
| Cotton linters | 30 |
| Unbleached kraft | 50 |
| Phenolic resin powder | 20 |

This was felted out completely to provide the tough core to the mixing bowl.

After the preform was completed the small felting cylinder was drained and the preform was blanketed. It was then removed from the felting screen, using a puff of compressed air. The preform was dried to 3% moisture in a 150° F. oven and molded at 800 p.s.i. for 5 minutes at 300° F. A strong, attractively finished bowl was produced.

It will be recognized that by use of the third tank shown in FIG. #2, a third component in resin fiber can be introduced.

EXAMPLE 8

This example shows how an improved plenum chamber for a car heating system can be pulp molded by the method of the invention.

One of the defects of pulp molded die dried articles is their rough unattractive finish. This is discussed and a solution given in U.S. Pat. 3,253,970. The solution proposed, however, permits peeling and delamination. The method of the present invention makes the surfacing fiber an integral part of the preform and avoids delamination.

The plenum chamber was felted in the small tank. It was found necessary for this tank to have no more than 15 times the volume of the accreted felt in order to felt rapidly and to deposit the fiber mixes as made. It was better if the volume was no more than five times that of the felt. On the other hand, two and three inch clearances had to be provided beyond the accreting felt so that the final fiber would deposit properly.

The small tank was piped with water, as in Example #1.

The apparatus of FIG. #1 was used and the following slurry at 0.15% consistency was metered into the lower container.

150 grams of Northern Kraft (dry basis)
20 grams of ground wood
20 grams of shredded wood
40 grams of hammermilled rag The following slurry was metered into the top container at 0.1% consistency:

35 grams of bleached Northern Kraft
25 grams of bleached ground wood

The small felting tank was filled with water and the water flow adjusted to keep the felting tool submerged. The stock from the lower container was brought into the felting tank and felted out. As it was used up, the finishing stock from the top container was phased in and accreted onto the preform. All the stock metered was felted out.

The cylinder was drained and the preform placed in heated vented dies and dried at 15 p.s.i. It was then dipped in varnish and baked to provide strength. A great improvement in appearance was obtained by the use of the finishing fiber.

It may be noted that in press drying a wet preform in solid drying dies the weight of the preform is critical. Too heavy a preform wedges in vertical clearances and the molding tools will not close, or the preform tears. Too light a preform and the vertical portions of the preform are not pressed. The method of the invention in which all metered fiber is felted is superior to giving the exact weight of preform required so that the preform is dried and pressed substantially uniformly.

What is claimed is:

1. A method of making fibrous articles comprising the steps of preparing a slurry of particulate material in a liquid carrier, delivering a predetermined quantity of said slurry to an unpressurized receptacle having an article former therein, said quantity being delivered substantially at the mid-portion of said former, causing the deposition of substantially all of the particulate material in said quantity on said former, while maintaining within said unpressurized receptacle sufficient liquid to continuously submerge said former during said deposition.

2. A method of forming fibrous articles comprising the steps of preparing a plurality of distinct stocks of materials in a liquid vehicle, each of said stocks containing a slurry of particulate materials of differing characteristics, metering a predetermined amount of each stock, each metered amount of stock containing, in toto, substantially all the particulate material required in the formation of said article, delivering in a predetermined sequence each metered amount of stock to an article former, said metered amounts being delivered substantially at the mid-portion of said former, said article former being maintained submerged within a liquid in an unpressurized receptacle during the delivery of the metered amounts, and causing the deposition of substantially all of the particulate material on said former while submerged.

3. The method according to claim 2 in which at least one of the particulate materials is cellulose fibers.

4. The method according to claim 2 wherein the deposition of the material is caused to sequentially and substantially deposit all of said material of one stock prior to the deposition of a succeeding material.

5. A method of accreting a porous body onto a foraminous former which comprises the steps of placing said former in an unpressurized receptacle, submerging said former in a quantity of liquid vehicle substantially free of particulate matter, delivering to said unpressurized receptacle a predetermined quantity of particulate matter sufficient for forming said porous body, said particulate matter being delivered substantially at the mid-portion of said former, causing said liquid vehicle to flow through said former to cause the accretion of all of said particulate matter thereon, while maintaining the former submerged during all of said accretion.

6. The method according to claim 2 which further comprises the steps of lowering the level of liquid in said receptacle below the body after accretion thereof is accomplished whereby the body may be removed without passage through liquid.

7. The method according to claim 2 wherein a plurality of predetermined amounts of particulate materials of physically differentiated characteristics is sequentially delivered to said receptacle and caused to accrete upon said former in sequence.

8. The method according to claim 2 wherein the delivery of said materials is caused to vary during said accretion in accordance with a predetermined arrangement of both sequence and relative proportion.

9. Apparatus for the manufacture of an accreted shaped body from a stock of liquid borne particulate matter comprising an unpressurized receptacle for the reception of said stock, a former located in said receptacle, means for maintaining said former continuously submerged in liquid, means for the storage of said stock, means for delivering a predetermined quantity of said stock to said receptacle substantially at the mid-portion of said former, said quantity being sufficient only to contain an amount of particulate matter necessary for the formation of said body, and means for causing said liquid to flow through said former to deposit substantially all of said particulate matter thereon.

10. Apparatus for the manufacture of an accreted shaped body from a plurality of stocks of liquid borne particulate matter, comprising an unpressurized receptacle for the reception of said stock, a former located in said receptacle, means for maintaining said former continuously submerged in a liquid free of particulate matter, means for the separate storage of each of said stocks, means for metering a predetermined amount of each of said stocks to said receptacle, means for delivering each of said metered amount of stock in a predetermined sequence to said receptacles substantially at the mid-portion of said former, and means for causing said liquid to flow through said former to deposit substantially all of the particulate matter on said former in said predetermined sequence.

11. Apparatus for the manufacture of accreted shaped bodies from a plurality of stocks of liquid borne particulate matter, comprising an unpressurized receptacle for the reception of said stock, a former located in said receptacle, means for maintaining said former continuously submerged in a liquid free of particulate matter, means for the separate storage of each of said stocks, means for metering a predetermined amount of each stock to said receptacle, means for delivering each of said metered amount of stock in predetermined sequence to said receptacle substantially at the mid-portion of said former, said delivering means including means for co-mingling successive stocks in predetermined amounts and sequences and means for causing the deposition of substantially all the particulate matter in said stocks on said former in said predetermined sequence.

12. Apparatus for the accretion of porous shaped bodies from a plurality of stocks of liquid borne particulate matter, comprising a plurality of containers corresponding to the number of stocks, a plurality of tanks connected downstream from such containers, means for delivering to each tank a predetermined quantity of its respective stock substantially at the mid-portion of said former, each tank having conduit means including flow control means for serially interconnecting said tanks, an unpressurized receptacle having a foraminous former therein for receiving said stocks, the last one of said tanks having a conduit and flow control means connecting it to said receptacle, and means controlling the rate of flow of said stock from said last tank to said receptacle and the rate of accretion of said particulate matter in said stock so as to substantially deposit said particulate matter sequentially.

13. The apparatus according to claim 12 including means for delivering said stocks to said receptacle in a predetermined sequence.

14. The apparatus according to claim 12 including means for maintaining said foraminous former continuously submerged in liquid.

15. The apparatus according to claim 12 including vacuum means for causing liquid to flow through said foraminous former depositing said particulate matter thereon.

16. The apparatus according to claim 12 including means to vary the density of said stock in said tanks as desired.

17. The apparatus according to claim 12 including conduit means having flow control means for interconnecting non-serial tanks so as to by-pass serial tanks as desired.

References Cited
UNITED STATES PATENTS

| | | | |
|---|---|---|---|
| 2,539,767 | 1/1951 | Anderson | 162—195 |
| 2,395,301 | 2/1946 | Sloan | 162—219X |
| 3,028,911 | 4/1962 | DeLear | 162—383 |
| 3,158,532 | 11/1964 | Pall et al. | 162—145X |

S. LEON BASHORE, Primary Examiner

A. D'ANDREA, JR., Assistant Examiner

U.S. Cl. X.R.

162—228, 387; 264—87